(12) United States Patent
Laxton

(10) Patent No.: US 10,444,553 B2
(45) Date of Patent: Oct. 15, 2019

(54) MAGNETOPHORETIC DISPLAY ASSEMBLY AND DRIVING SCHEME

(71) Applicant: E Ink California, LLC, Fremont, CA (US)

(72) Inventor: Peter B. Laxton, Marshfield, MA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 664 days.

(21) Appl. No.: 14/666,040

(22) Filed: Mar. 23, 2015

(65) Prior Publication Data

US 2015/0277160 A1   Oct. 1, 2015

Related U.S. Application Data

(60) Provisional application No. 61/970,304, filed on Mar. 25, 2014.

(51) Int. Cl.
| | | |
|---|---|---|
| *G02B 26/00* | (2006.01) | |
| *G02B 26/08* | (2006.01) | |
| *G02F 1/29* | (2006.01) | |
| *G02F 1/09* | (2006.01) | |
| *B42D 25/369* | (2014.01) | |

(52) U.S. Cl.
CPC .............. *G02F 1/09* (2013.01); *B42D 25/369* (2014.10); *G02F 2001/094* (2013.01)

(58) Field of Classification Search
USPC ....... 359/290–292, 295, 296, 298, 237, 242, 359/247
See application file for complete search history.

(56) References Cited

U.S. PATENT DOCUMENTS

| | | |
|---|---|---|
| 4,552,928 A | 11/1985 | Bauld et al. |
| 4,594,400 A | 6/1986 | Kvita et al. |
| 4,631,328 A | 12/1986 | Ringsdorf et al. |
| 4,643,684 A | 2/1987 | Murata et al. |
| 4,769,443 A | 9/1988 | Cantatore |
| 5,151,032 A | 9/1992 | Igawa |
| 5,930,026 A | 7/1999 | Jacobson et al. |
| 5,949,050 A * | 9/1999 | Fosbenner .............. G09F 9/375 235/449 |
| 6,870,661 B2 | 3/2005 | Pullen et al. |
| 6,930,818 B1 | 8/2005 | Liang et al. |
| 7,157,195 B2 | 1/2007 | Kokeguchi |
| 7,414,776 B2 | 8/2008 | Liu et al. |

(Continued)

FOREIGN PATENT DOCUMENTS

| | | |
|---|---|---|
| EP | 0310707 B1 | 9/1992 |
| JP | 2004020936 | 1/2004 |

(Continued)

OTHER PUBLICATIONS

U.S. Appl. No. 61/970,304, filed Mar. 25, 2014, Laxton.

(Continued)

*Primary Examiner* — Brandi N Thomas
(74) *Attorney, Agent, or Firm* — Brian D. Bean

(57) ABSTRACT

The present invention is directed to a magnetophoretic display assembly and a driving scheme for such a display assembly. It provides a low-cost imaging display assembly which is capable of displaying desired re-writeable images. A single driving element can be used to display images on any number of individual imaging films.

16 Claims, 6 Drawing Sheets

(56) References Cited

U.S. PATENT DOCUMENTS

| | | | |
|---|---|---|---|
| 8,672,532 B2* | 3/2014 | Jovanovich | B01F 11/0045 366/181.5 |
| 2002/0084880 A1* | 7/2002 | Barbera-Guilem | B03C 1/288 336/200 |
| 2002/0171910 A1* | 11/2002 | Pullen | G02F 1/167 359/296 |
| 2002/0196217 A1* | 12/2002 | Kanno | G02F 1/09 345/86 |
| 2004/0191653 A1* | 9/2004 | Kokeguchi | G03G 19/00 430/39 |
| 2007/0215553 A1* | 9/2007 | Yellen | B01F 13/0809 210/695 |
| 2014/0313565 A1* | 10/2014 | Ji | G02B 26/026 359/296 |

FOREIGN PATENT DOCUMENTS

| | | |
|---|---|---|
| JP | 2004295025 | 10/2004 |
| JP | 2007121677 | 5/2007 |
| WO | WO 01/067170 | 9/2001 |

OTHER PUBLICATIONS

Sprague, R.A. (Sep. 23, 2009) SiPix Microcup Electrophoretic Epaper for Ebooks. *NIP* 25, 2009 pp. 460-462. (Presentation conducted on Sep. 23, 2009 at the 25th Int'l Conference on Digital Printing Technologies, Digital Fabrication 2009 (NIP 25) by Society.

Zang, H.M., Wang, F., Kang, Y.M., Chen, Y. and Lin, W. (Jul. 2007) *Microcup® e-Paper for Embedded and Flexible Designs.* IDMC'07, Taipei International Convention Center, Taiwan.

Zang, H.M. (Feb. 2007) *Developments in Microcup® Flexible Displays.* Presentation conducted at the 6th Annual Flexible Display and Microelectronics Conference, Phoenix, AZ Feb. 6-8.

Ho, Andrew. (Nov. 2006) *Embedding e-Paper in Smart Cards, Pricing Labels & Indicators.* Presentation conducted at Smart Paper Conference Nov. 15-16, 2006, Atlanta, GA, USA.

Zang, H.M. (Sep. 2006) *Monochrome and Area Color Microcup®EPDs by Roll-to-Roll Manufacturing Process.* Presentation conducted at the Fourth Organic Electronics Conference and Exhibition (OEC-06), Sep. 25-27, 2006, Frankfurt, Germany.

Wang, X., Zang, H.M. and Li, P. (Jun. 2006) Roll-to-Roll Manufacturing Process for Full Color Electrophoretic film. *SID Digest*, 00 pp. 1587-1589.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

Wang, X., Li, P., Sodhi, D., Xu, T.,Bruner, S and Hiraoka M. (Feb. 2006) *Inkjet Fabrication of Multi-Color Microcup® Electrophorectic Display.* The 5$^{th}$ Flexible Microelectronics & Displays Conference of U.S. Display Consortium (Feb. 2006), Phoenix, Arizona.

Liang, R.C., (Feb. 2005) *Flexible and Roll-able Displays/Electronic Paper—A Brief Technology Overview.* Flexible Display Forum, 2005, Taiwan.

Zang, H.M. & Hou, Jack, (Feb. 2005) *Flexible Microcup® EPD by RTR Process.* Presentation conducted at 2$^{nd}$ Annual Paper-Like Displays Conference, Feb. 9-11, 2005, St. Pete Beach, Florida.

Ho, Candice. (Feb. 1, 2005) *Microcupt® Electronic Paper Device and Application.* Presentation conducted at USDC 4th Annual Flexible Display Conference 2005.

Bardsley, J.N. & Pinnel, M.R. (Nov. 2004) Microcup™ Electrophoretic Displays. *USDC Flexible Display Report*, 3.1.2. pp. 3-12-3-16.

Liang, R.C. (Oct. 2004) *Flexible and Roll-able Displays/Electronic Paper—A Technology Overview.* Paper presented at the METS 2004 Conference in Taipie, Taiwan.

Liang, R.C., Zang, H.M., Wang, X., Chung, J. & Lee, H., (Jun./Jul. 2004) « Format Flexible Microcup® Electronic Paper by Roll-to-Roll Manufacturing Process », Presentation conducted at the 14th FPD Manufacturing Technology EXPO & Conference.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Liang, R.C. (Apr. 2004). *Microcup Electronic Paper by Roll-to-Roll Manufacturing Process.* Presentation at the Flexible Displays & Electronics 2004 of Intertech, San Fransisco, California, USA.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Wang, X., Kiluk, S., Chang, C., & Liang, R.C. (Feb. 2004). Mirocup® Electronic Paper and the Converting Processes. *ASID*, 10.1.2-26, 396-399, Nanjing, China,.

Zang, H.M. (Feb. 2004). *Microcup Electronic Paper.* Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE*vol. 5289, 102-108.

Ho, C., & Liang, R.C. (Dec. 2003). *Microcup ® Electronic Paper by Roll-to-Roll Manufacturing Processes.* Presentation conducted at FEG, Nei-Li, Taiwan.

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Zang, H.M. (Oct. 2003). *Microcup ® Electronic Paper by Roll-to-Roll Manufacturing Processes.* Presentation conducted at the Advisory Board Meeting, Bowling Green State University, Ohio, USA.

Allen, K. (Oct. 2003). Electrophoretics Fulfilled. *Emerging Displays Review: Emerging Display Technologies, Monthly Report*—Oct. 9-14 2003.

Kleper, M., Miller, P., Miller L. (Oct. 2003) An Investigation of the Emerging and Developing Technologies Related to the Generation Beyond Print-on-Paper. *Advanced Display Technologies*, Oct. 2003, pp. 13-15, Rochester Institute of Technology (R.I.T.).

Zang, H.M., & Liang, R.C. (2003) Microcup Electronic Paper by Roll-to-Roll Manufacturing Processes. *The Spectrum*, 16(2), 16-21.

Chen, S.M. (Jul. 2003) The Applications for the Revolutionary Electronic Paper Technology. *OPTO News & Letters*, 102, 37-41. (in Chinese, English abstract attached).

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C., Hou, J., Chung, J., Wang, X., Pereira, C., & Chen, Y. (May 2003). Microcup® Active and Passive Matrix Electrophoretic Displays by A Roll-to-Roll Manufacturing Processes. *SID Digest*, vol. 34, Issue 1, pp. 838-841, 20.1.

Chen, S.M. (May 2003) The New Application and the Dynamics of Companies. *TRI*. 1-10. (In Chinese, English abstract attached).

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup® Electrophoretic Displays.* Paper presented at the IDMC, Taipei, Taiwan.

Liang, R.C., & Tseng, S. (Feb. 2003). *Microcup® LCD, A New Type of Dispersed LCD by A Roll-to-Roll Manufacturing Process.* Paper presented at the IDMC, Taipei, Taiwan.

Liang, R.C. (Feb. 2003) *Microcup® Electrophoretic and Liquid Crystal Displays by Roll-to-Roll Manufacturing Processes.* Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

(56) References Cited

OTHER PUBLICATIONS

Nikkei Microdevices. (Dec. 2002) Newly-Developed Color Electronic Paper Promises—Unbeatable Production Efficiency. *Nikkei Microdevices*, p. 3. (in Japanese, with English translation).

\* cited by examiner

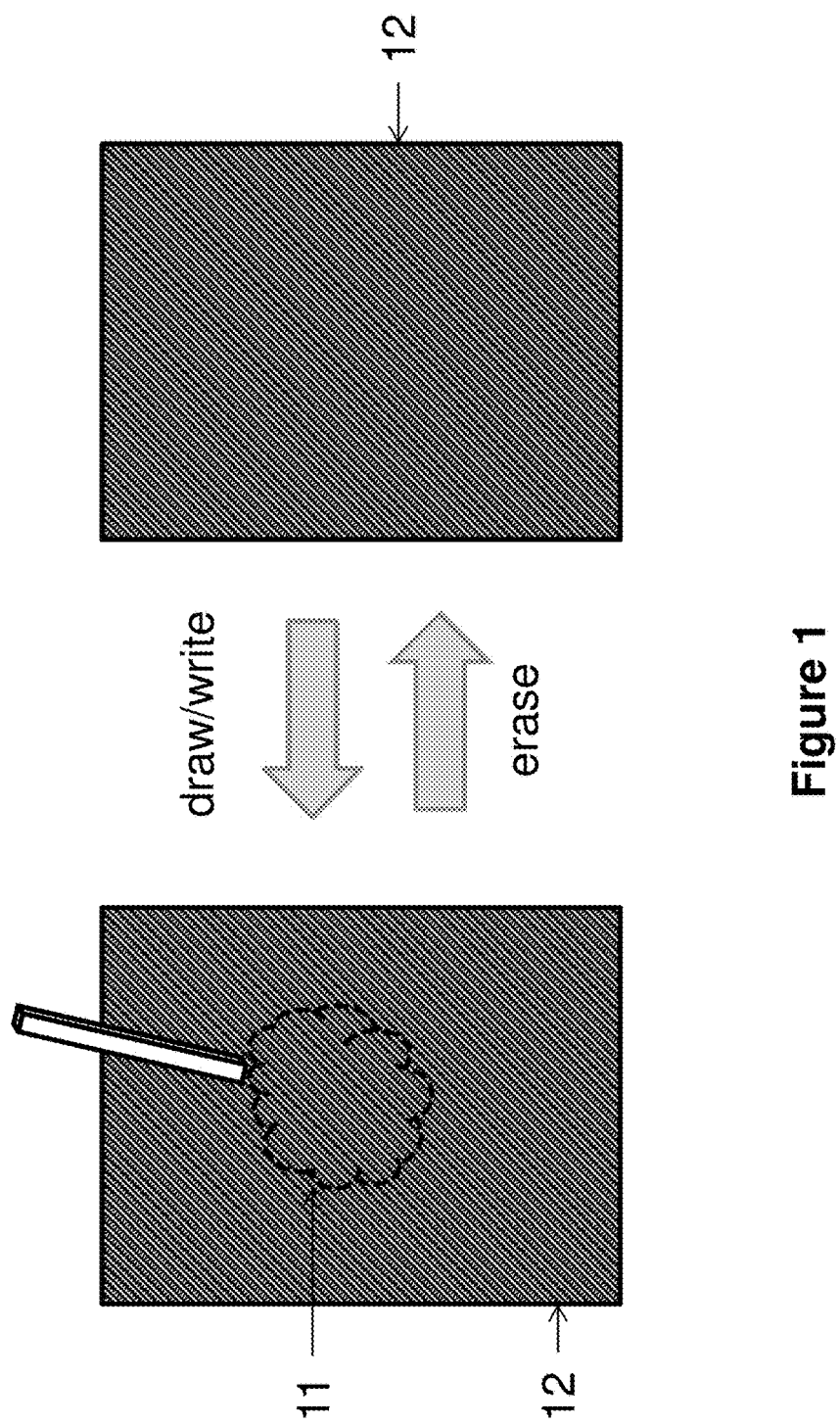

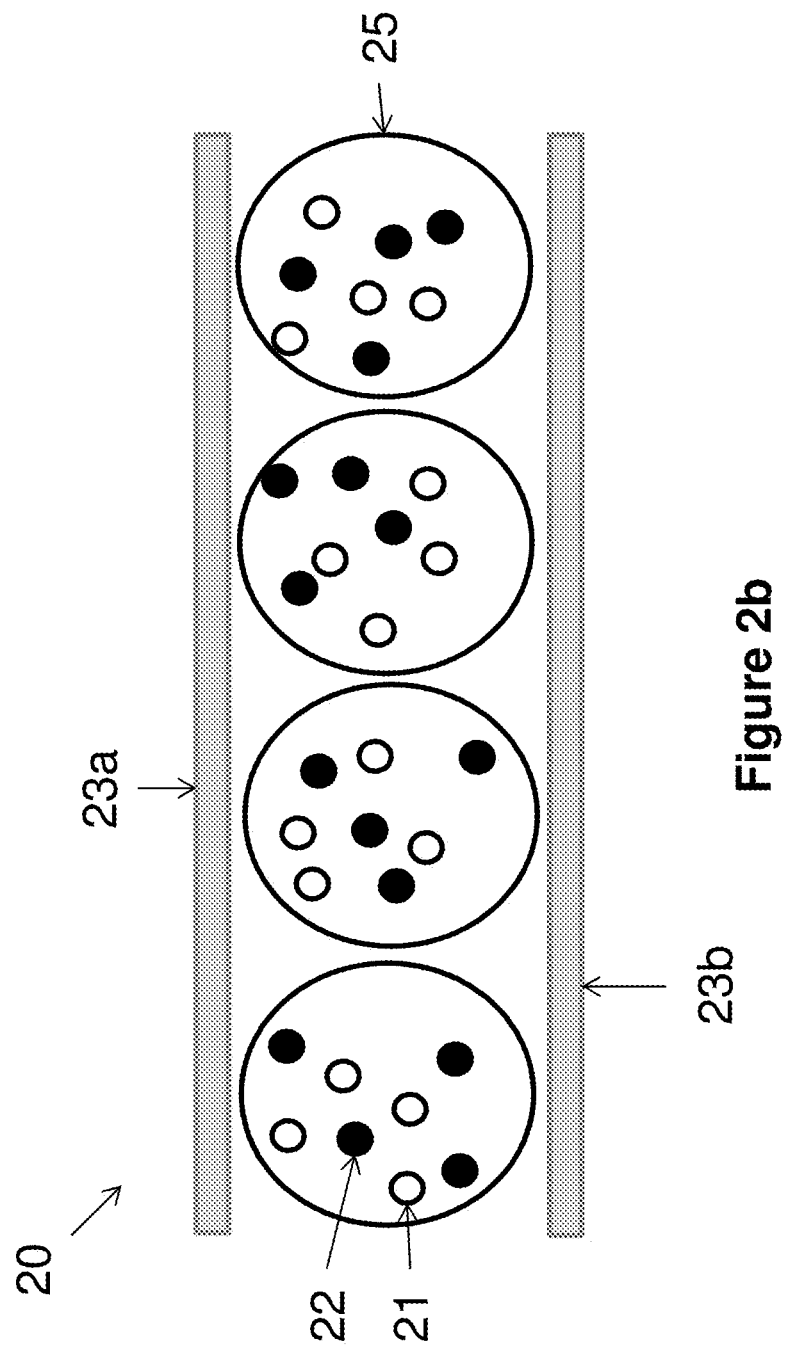

MAGNETOPHORETIC DISPLAY ASSEMBLY AND DRIVING SCHEME

The present invention claims the benefit of U.S. Provisional Application No. 61/970,304, filed Mar. 25, 2014; which is incorporated herein by reference in its entirety.

TECHNICAL FIELD

The present invention is directed to a magnetophoretic display assembly and a driving scheme for such a display assembly. It provides a low-cost imaging display assembly which is capable of displaying desired re-writeable images. A single driving element can be used to display images on any number of individual imaging films.

SUMMARY OF THE INVENTION

One aspect of the present invention is directed to a magnetophoretic display device assembly, which comprises
  a) a magnetic sheet;
  b) a pattern-generating means; and
  c) a magnetophoretic imaging film.

In one embodiment, the magnetic sheet comprises magnetic particles dispersed in a polymeric matrix. In one embodiment, the magnetic sheet has a thickness in the range of 12 µm to 10 mm.

In one embodiment, the pattern-generating means is formed of a neodymium magnet. In one embodiment, the pattern-generating means is an electromagnet. In one embodiment, the pattern-generating means is a stylus. In one embodiment, the pattern-generating means is in the form of a stamp with a pre-determined pattern. In one embodiment, the pattern-generating means is a strong magnet mounted on a computer controlled read-write head.

In one embodiment, the magnetophoretic imaging film comprises display cells filled with a magnetophoretic fluid comprising non-magnetic particles and magnetic particles dispersed in a solvent or solvent mixture. In one embodiment, the non-magnetic particles are white. In one embodiment, the white non-magnetic particles are formed from an inorganic pigment. In one embodiment, the white non-magnetic particles are polymer particles having a refractive index of >1.5 and of a size of >100 nm.

In one embodiment, the magnetic particles are formed from highly magnetic compounds and metals or alloys. In one embodiment, the magnetic particles are formed from a material selected from the group consisting of gamma ferric oxide, acicular magnetite, cobalt-modified or adsorbed ferric oxide, berthollide ferric oxide, chromium dioxide, metals or alloys and organic polyradicals.

In one embodiment, the assembly is useful for anti-counterfeiting or interactive packaging.

Another aspect of the present invention is directed to a method for displaying a desired pattern on a magnetophoretic imaging film, which method comprises
  a) providing a magnetic sheet and a pattern-generating means;
  b) generating the desired pattern on the magnetic sheet with the pattern-generating means; and
  c) bringing the magnetophoretic imaging film within magnetic field of the magnetic sheet to allow the desired pattern to appear on the magnetophoretic imaging film.

In one embodiment, the desired pattern remains after the magnetophoretic imaging film is moved outside the magnetic field of the magnetic sheet. In one embodiment, the desired pattern disappears after the magnetophoretic imaging film is moved outside the magnetic field of the magnetic sheet.

In one embodiment, the magnetophoretic imaging film comprises display cells filled with a magnetophoretic fluid comprising non-magnetic particles and magnetic particles dispersed in a solvent or solvent mixture. In one embodiment, the non-magnetic particles are white.

BRIEF DESCRIPTION OF DRAWINGS

FIG. 1 shows a pattern generated on a magnetic film and process being reversible.

FIGS. 2a and 2b are cross-section views of a magnetophoretic imaging film.

FIGS. 3-1 and 3-2 illustrate how a desired pattern is displayed on a magnetophoretic imaging film.

DETAILED DESCRIPTION OF THE INVENTION

In one aspect, the present invention is directed to a magnetophoretic display assembly, which comprises
  a) a magnetic sheet;
  b) a pattern-generating means; and
  c) a magnetophoretic imaging film.

A magnetic sheet can hold a patterned magnetic field. It comprises a plurality of magnetic particles dispersed in a solid and normally flexible polymeric matrix.

The magnetic field can be easily manipulated via an external magnet (e.g., pattern-generating means). Through manipulation of the magnetic field, the magnetic particles in the magnetic sheet can be magnetically oriented so that the magnetic field of the magnetic sheet is arranged into the shape of a desired pattern. This pattern will remain stable over time until acted upon by an external magnet to cause re-writing.

Figures 1, 3:
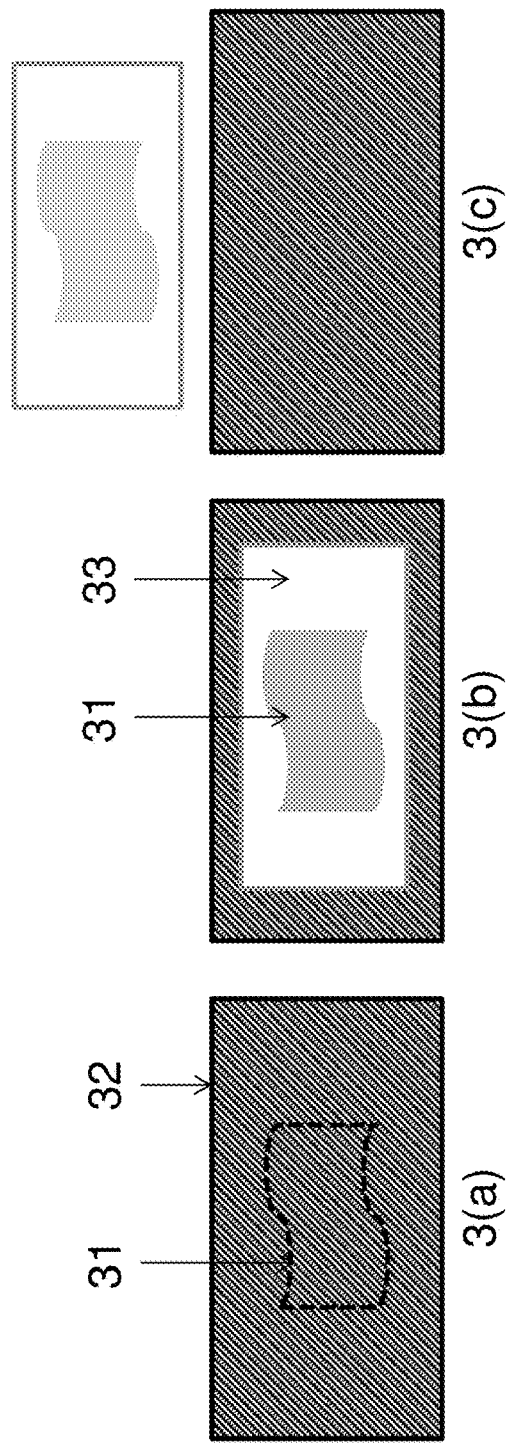

As shown in FIG. 1, a pattern (11) is generated on a magnetic sheet (12). For illustration purpose, the pattern is visually distinct; however, in practice, the pattern is usually not detectable visually.

Magnetic sheets are broadly available in the consumer marketplace. They are commonly composed of iron oxide particles dispersed within a polymeric matrix, such as a vinyl matrix. In principle, any magnetic particles and polymer matrix materials could be suitable. The requirements of such a sheet are that the magnetic field is strong enough to produce an image on a magnetophoretic imaging film and the magnetic field of the dispersed magnetic particles can be re-aligned by an external magnetic field.

The thickness of the sheet is preferably in the range of 12 µm to 10 mm.

The pattern generated on the magnetic sheet may be permanent and can be erased. In other words, the pattern-generating process is reversible, as shown in FIG. 1.

The pattern-generating means, in the context of the present invention, is formed of a material of strong magnetic, such as a neodymium magnet, commonly alloys of NdFeB (or NIB). Alternatively, an electromagnet could be employed for this purpose. The pattern-generating means must have a magnetic field of sufficient strength to rearrange the magnetic particles in the magnetic sheet to generate a desired pattern.

The pattern-generating means may be a stylus which can be used by a user to draw or write, free-hand, a pattern, such as an image, graphic and/or text.

The pattern-generating means may also be a strong magnet in the form of a stamp, with a pre-determined pattern. When such a stamp is applied to the magnetic sheet, a pattern corresponding to the pre-determined pattern is generated on the sheet.

The pattern-generating means may also be a strong magnet mounted on a computer controlled (i.e., x-y axis motion controlled) head, as in a read-write head. In this way, computer generated images could be translated onto the magnetic sheet.

Figure 2A:
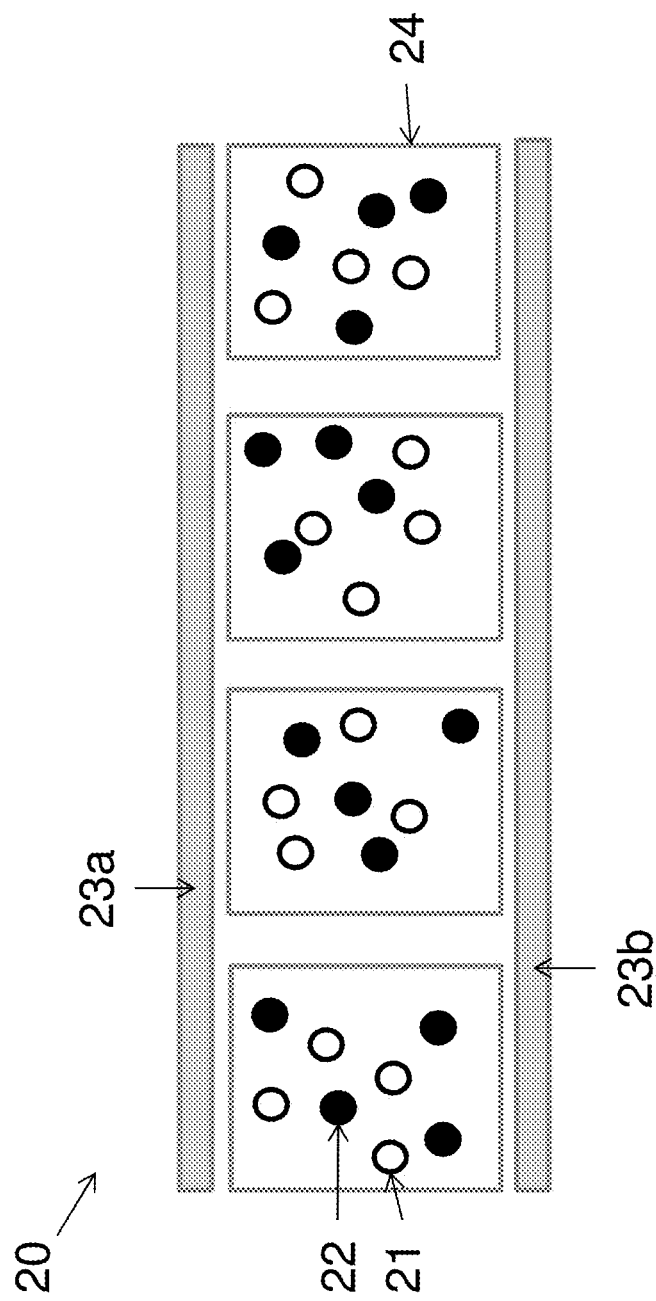

Cross-section views of magnetophoretic imaging film (20) are shown in FIGS. 2a and 2b. In FIG. 2a, a magnetophoretic fluid is filled in a plurality of microcells (24) and the filled microcells are sandwiched between two substrates (23a and 23b).

Details of the microcell structure can be found in U.S. Pat. No. 6,930,818, the content of which is incorporated herein by reference in its entirety.

In FIG. 2b, a magnetophoretic fluid is filled in microcapsules (25) and the filled microcapsules are also sandwiched between two substrates (23a and 23b). Details of the microcapsule structure can be found in U.S. Pat. No. 5,930,026, the content of which is incorporated herein by reference in its entirety.

Suitable substrates include sheets, plates or films prepared from poly(ethylene terephthalate), poly(ethylene naphthalate), polycarbonate, polysulfone, polyimide, epoxy, phenolic, acrylics, unsaturated polyester, polyamide, polyurethane, polyurea and composites thereof, and the like.

The magnetophoretic fluid comprises two types of particles, one type being non-magnetic particles (21) which may be charged or uncharged, and another type being magnetic particles (22). Both types of particles are dispersed in a solvent or solvent mixture.

In FIGS. 2a and 2b, the non-magnetic particles are of a white color and the magnetic particles are of a black color. When white non-magnetic particles are specifically mentioned in this application, it is understood that the color of the non-magnetic particles is not limited to white. In fact, the present application broadly encompasses non-magnetic particles of any non-black color in a magnetophoretic fluid.

The white non-magnetic particles may be formed from an inorganic pigment such as $TiO_2$, $ZrO_2$, $ZnO$, $Al_2O_3$, $Sb_2O_3$, $BaSO_4$, $PbSO_4$ or the like. They may also be polymer particles with a high refractive index (>1.5) and of a certain size (>100 nm) to exhibit a white color. If they are charged, the white non-magnetic particles may exhibit a native charge, or may be charged explicitly using a charge control agent, or may acquire a charge when dispersed in a solvent or solvent mixture. Suitable charge control agents are well known in the art; they may be polymeric or non-polymeric in nature, and may also be ionic or non-ionic.

The black magnetic particles may be formed from highly magnetic compounds and metals or alloys. Examples of magnetic material useful in this invention include gamma ferric oxide, acicular magnetite, cobalt-modified or adsorbed ferric oxide, berthollide ferric oxide, chromium dioxide, metals or alloys (such as stainless steel, Fe—Co, Fe—Ni, Fe—Co—Ni, Co—Ni, Co—Cr and Fe—Co—V alloys), organic polyradicals (such as polymers with organic radicals in the side chain, main-chain conjugated polymers with organic radicals, two dimensional polyradicals, polymers containing paramagnetic metalloporphyrins as side chains and polymers containing paramagnetic metal ions, e.g., Cu(II), Ni(II), Mn(II) or VO(II), in the main chain). Other useful magnetic materials can be found in references such as "Magnetic Recording Handbook" by Marvin Camras; Van Norstrand Reinhold Co., (1988); and M. Kanachi "Magnetic Polymers" in "Functional Monomers and Polymers", ed. By K. Takemoto, R. M. Ottenbrite and M. Kamachi; Marcel Dekker, Inc., (1997), the contents of which are incorporated herein by reference in their entirety.

Specific examples of organic polyradicals include, but not limited to, those shown in the references identified above and several U.S. Pat. Nos. (e.g., 4,631,328, 4,594,400, 4,552,928 and 4,769,443), the contents of which are incorporated herein by reference in their entirety. Organic polyradicals shown by Kanachi in "Magnetic Polymers" may include those containing 2,2,6,6-tetramethylpiperidine-1-oxyl as a side chain, thermally annealed polyphenylacetylene, those with phenoxy or nitroxy radicals, poly(1,3-phenyleneethynylene) with pendant nitronyl nitroxide or t-butylnitroxyl, two-dimensional polymers, such as that obtained by reacting 1,3,5-triaminobenzene with iodine, those with a repeating unit derived from indigo, those obtained from the catalyst-free 1,3-dipolar cycloaddition of 1,3-bis-(3-sydnone) and N',N'-(1,4-phenylene)bismaleamide, those containing paramagnetic ions either in the side chain or in the main chain. Those containing paramagnetic ions in the side chain include compounds containing tetraphenylporphyrin (TPP) moieties, especially those derived from paramagnetic metal ions, for example, Cu(II), Ag(II), VO(II) and Co(II), and that derived from the reaction of TPP-Mn(II) and tetracyanoethylene in toluene. Those containing paramagnetic ions in the main chain include a heterobinuclear complex of Cu(II) and VO(II), an inorganic polymer, $MnCu(pbaOH)(H_2O)_3$ with regularly alternating magnetic centers, where pbaOH is 2-hydroxy-1,3-propylenebis(oxamato), polymers composed of 2-substituted 4,4,5,5-tetramethylimidazoline-1-oxyl-3-oxide and derived from Cu(II), Ni(II) or Mn(II), linear chain polymers of $M(hfac)_2(NIT)R$ where M is Cu(II), Ni(II) or Mn(II), (NIT)R is 2-alkyl-4,4,5,5-tetramethylimidazoline-1-oxyl-3-oxide and hfac is hexafluoroaceteylacetonate, and three dimensional structures, such as $(rad)_2Mn_2[Cu(opba)]_3(DMSO)_2:2H_2O$, where rad is 2-(4-N-methylpyridinium)-4,4,5,5-tetramethylimidazoline-1-oxyl-3-oxide, opba is o-phenylenebis(oxamato) and DMSO is dimethyl sulfoxide. Other polymeric radical containing compounds, (with the identity of the radical and its location indicated in the parentheses), are those described in U.S. Pat. No. 4,631,328 (various anthraquinone, stilbene, mono-, bis- or tris-azo dyes, side chain), U.S. Pat. No. 4,594,400 (thioxanthone, side chain), U.S. Pat. No. 4,552,928 (di- and triphenylamine, side chain) and U.S. Pat. No. 4,769,443 (piperidine, side chain). Some of these organic polyradicals may be prepared by including radical precursors in the prepolymer mixture, effecting polymerization and then conversion to the radicals.

Other suitable materials for the magnetic particles are well-known in the art.

The two types of particles (21 and 22) may be dispersed in the solvent or solvent mixture by any of the well-known methods, including grinding, milling, attriting, microfluidizing and ultrasonic techniques.

Low vapor pressure, non-hygroscopic solvents are preferred for the magnetophoretic fluid. Examples of useful solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, low viscosity polyethers such as polypropylene glycols and block copolymers of ethylene glycol and propylene glycol, low viscosity silicone oils, alkyl or alkylaryl esters and ketones, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane and pentachlorobenzene, perfluoro solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene)s such as Halocarbon Oils from Halocarbon Product Corp., River Edge, N.J. and perfluoropolyalkylether such as Galden from Ausimont or Krytox Oils and Greases K-Fluid Series from DuPont, Del. In one preferred embodiment, poly (chlorotrifluoroethylene) may be used as a dielectric solvent. In another preferred embodiment, poly(perfluoropropylene oxide) may be used as a solvent.

In another aspect, the present invention is directed to a method for displaying an image on a magnetophoretic imaging film.

Figures 2, 3:
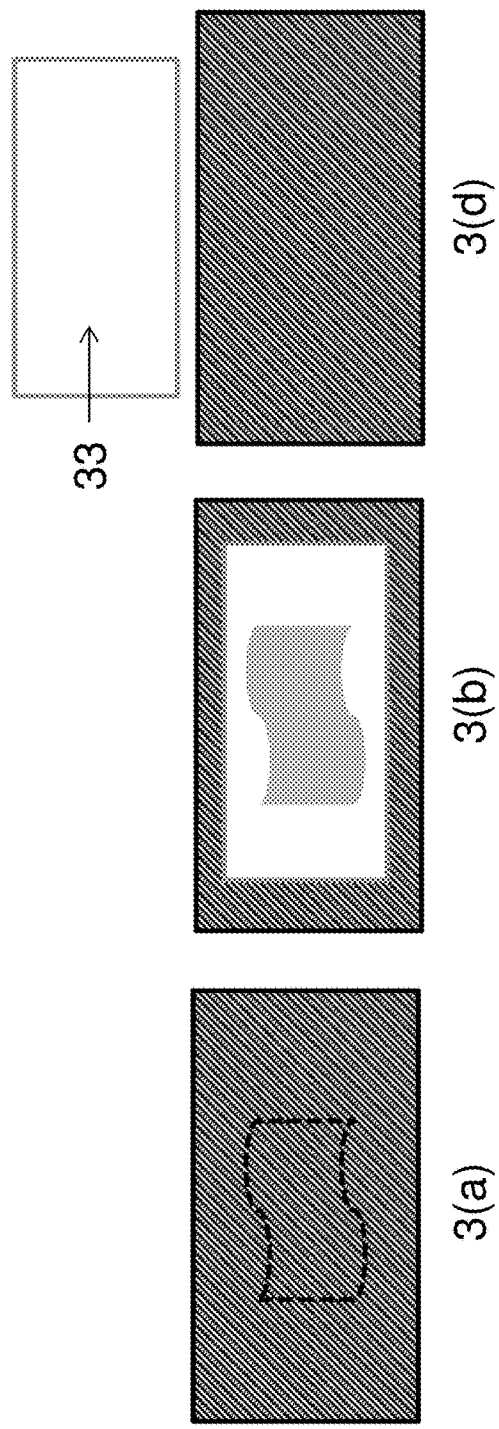

FIGS. 3-1 and 3-2 illustrate how the present assembly is operated. FIG. 3(a) shows that a pattern (31) is generated on a magnetic sheet (32).

In FIG. 3(b), a magnetophoretic imaging film (33) is brought within the magnetic field of the magnetic sheet (32), and as a result, the pattern (31) appears on the imaging film.

The pattern may be semi-permanent, where the image will persist even when the film is outside of the influence of the magnetic sheet (see FIG. 3(c)). In this embodiment the magnetophoretic fluid must have sufficient viscosity of at least 50 cps, at low shear and at operating temperatures to prevent the particles from re-dispersing, thus destroying the image.

Alternatively, the pattern is only displayed when the magnetophoretic imaging film is within the magnetic field of the magnetic sheet. This may be achieved by a number of ways. For example, it may be achieved by reducing or eliminating image stability of the display device.

Typically, magneto- or electrophoretic display fluids are formulated with rheology modifiers to impart image stability. Suitable rheology modifiers may include polymers of high molecular weight of >250 kDa, such as polyisobutylene. If a display fluid is formulated without any rheology modifiers and with sufficiently low pigment concentrations, the image stability is reduced or eliminated.

In FIG. 3(d), it is shown that the pattern disappears when the imaging film is removed from the magnetic sheet. This occurs due to the fact that the imaging film lacks image stability which causes the particles to re-disperse, thus losing the image.

This particular type of assembly as shown in FIG. 3(d) may prove useful for anti-counterfeit packaging or interactive packaging. As an example of the anti-counterfeit packaging, a pre-written magnetic sheet could be incorporated into any type of packaging. It could be incorporated into packaging in such a way that it is invisible. For example, the magnetic sheet may be glued inside a package wall. This magnetic sheet could then be read by a piece of magnetophoretic imaging film through the package wall to verify authenticity of the contents. It would be advantageous for the imaging film to have no 'memory' or residual image from this reading activity so that it may be of general use for any product for many cycles of use.

The interactive packaging example could behave in a similar way. For example, the magnetic sheet and imaging film could both be incorporated into the packaging in such a way that a simple action of opening the package brings the two components within range of the magnetic action. Thus an image would be displayed. Upon closing the package, the image would disappear.

Figure 4:
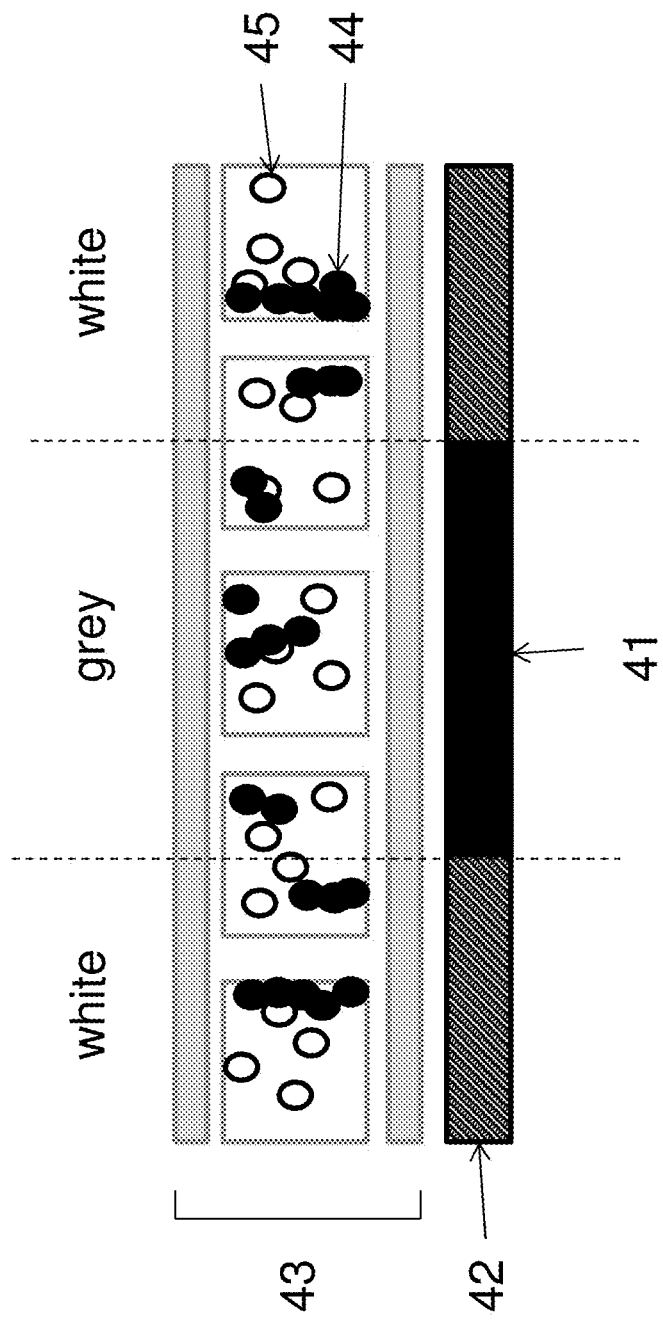
FIG. 4 is a cross-section view of a magnetic sheet and a magnetophoretic imaging film on top of the magnetic sheet.

FIG. 4 is a cross-section view of 3(b) in FIGS. 3-1 and 3-2. The magnetic sheet (42) shows a pattern (41). When the imaging film (43) is placed on top of the magnetic sheet, the black magnetic particles (44) in the magnetophoretic fluid will arrange themselves so as to follow the magnetic field lines of the patterned magnetic sheet. The white non-magnetic particles (45) at the same time are randomly dispersed in the solvent. As a result, a white color is displayed on the imaging film (43) in the areas outside of the pattern area, where the magnetic field is such that the black magnetic particles are collected either to the non-viewing side of the imaging film or at the boundaries of the microcell or microcapsule structure.

The area (corresponding to the pattern area) on the imaging film displays a grey color where the magnetic field is such that the black magnetic pigments are collected at the viewing plane. The grey color is the result of white non-magnetic particles being randomly dispersed in the solvent and black magnetic particles being arranged by the magnetic field lines. The white and gray appearance of the imaging film result in a visible light reflectance contrast arranged by the magnetic sheet that displays the desired image.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:
1. A magnetophoretic display device, comprising:
a magnetic sheet having a magnetic pattern thereon, and
a magnetophoretic imaging film comprising a substrate and a plurality of at least one of microcells and microcapsules applied to the substrate, the microcells and microcapsules containing a fluid, non-magnetic particles, and magnetic particles.
2. The device of claim 1, wherein said magnetic sheet comprises magnetic particles dispersed in a polymeric matrix.
3. The device of claim 1, wherein the magnetic sheet has a thickness in the range of 12 µm to 10 mm.
4. The device of claim 1, further comprising a pattern-generating means configured to generate the magnetic pattern in the magnetic sheet.
5. The device of claim 4, wherein the pattern-generating means is an electromagnet.
6. The device of claim 4, wherein the pattern-generating means is a stylus.
7. The device of claim 4, wherein the pattern-generating means is in the form of a stamp with a pre-determined pattern.
8. The device of claim 4, wherein the pattern-generating means is a magnet mounted on a computer controlled read-write head.
9. The device of claim 1, wherein the fluid comprises a solvent.
10. The device of claim 1, wherein the non-magnetic particles are white.

11. The device of claim 10, wherein the white non-magnetic particles are formed from an inorganic pigment.

12. The device of claim 10, wherein the white non-magnetic particles are polymer particles having a refractive index of >1.5 and of a size of >100 nm.

13. The device of claim 1, wherein the magnetic particles are formed from highly magnetic compounds and metals or alloys.

14. The device of claim 1, wherein the magnetic particles are formed from a material selected from the group consisting of gamma ferric oxide, acicular magnetite, cobalt-modified or adsorbed ferric oxide, berthollide ferric oxide, chromium dioxide, metals or alloys and organic polyradicals.

15. The device of claim 4, wherein the pattern-generating means is formed of a neodymium magnet.

16. A packaging in combination with a device according to claim 1, wherein the magnetic sheet is incorporated in the packaging and the packaging is configured such that the magnetophoretic imaging film forms an image of the magnetic pattern when applied to a surface of the packaging in proximity to the magnetic sheet.

\* \* \* \* \*